United States Patent
Dezellem et al.

(10) Patent No.: US 10,406,719 B2
(45) Date of Patent: Sep. 10, 2019

(54) ELECTRIC VENEER LATHE

(71) Applicant: USNR, LLC, Woodland, WA (US)

(72) Inventors: Tim Dezellem, Vancouver, WA (US); Kevin K. O'Connell, Portland, OR (US); Frederick Reeder Bridges, III, Portland, OR (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 15/462,566

(22) Filed: Mar. 17, 2017

(65) Prior Publication Data
US 2017/0282399 A1  Oct. 5, 2017

Related U.S. Application Data

(62) Division of application No. 14/882,261, filed on Oct. 13, 2015, now Pat. No. 9,597,817.

(60) Provisional application No. 62/063,948, filed on Oct. 15, 2014, provisional application No. 62/076,432, filed on Nov. 6, 2014.

(51) Int. Cl.
*B27L 5/02* (2006.01)
*B27L 5/00* (2006.01)

(52) U.S. Cl.
CPC . *B27L 5/02* (2013.01); *B27L 5/00* (2013.01); *B27L 5/025* (2013.01)

(58) Field of Classification Search
CPC .......................................................... B27L 5/02
USPC ........................................ 318/560, 34, 558
See application file for complete search history.

(56) References Cited

U.S. PATENT DOCUMENTS

| | | | |
|---|---|---|---|
| 2,340,532 A * | 2/1944 | Jackson | B27L 5/02 144/209.1 |
| 3,886,424 A | 5/1975 | Hoshina | |
| 4,506,714 A | 5/1985 | Shrum et al. | |
| 4,526,053 A | 7/1985 | Carson | |
| 6,184,644 B1 * | 2/2001 | Eguchi | G05B 19/404 318/624 |

(Continued)

FOREIGN PATENT DOCUMENTS

CN   202946633 U   5/2013
WO   WO2016061137 A1   4/2016

OTHER PUBLICATIONS

New Zealand Patent Application No. 730824; Examination Report; dated Sep. 27, 2017.

(Continued)

*Primary Examiner* — David Luo
(74) *Attorney, Agent, or Firm* — Schwabe Williamson & Wyatt, P.C.

(57) ABSTRACT

Embodiments of an electric linear actuator may include a roller screw assembly, an electric motor coupled to the roller screw assembly, and a linear transducer operatively coupled with the roller screw assembly. The motor may be configured to drive the roller screw assembly to extend and retract another component, such as a rod. In some embodiments, the linear transducer may be configured to detect a position of the rod. The roller screw assembly may be coupled directly to the motor via a gear coupling, with the motor disposed generally in axial alignment with the roller screw assembly. Other embodiments disclosed herein include a veneer lathe carriage with electric linear actuators and corresponding apparatuses, methods, and systems.

20 Claims, 13 Drawing Sheets

(56) References Cited

U.S. PATENT DOCUMENTS

| | | | |
|---|---|---|---|
| 6,531,798 B1* | 3/2003 | Palmero | F16H 25/2018 310/112 |
| 6,772,809 B2* | 8/2004 | Puranen | B27L 5/025 144/211 |
| 8,266,976 B2* | 9/2012 | Waide | F16H 25/2252 74/424.92 |
| 2003/0030401 A1 | 2/2003 | Fujishima et al. | |
| 2007/0046677 A1 | 5/2007 | Hong et al. | |
| 2010/0242643 A1 | 9/2010 | Waide | |
| 2011/0096808 A1 | 4/2011 | Hwang et al. | |
| 2016/0107329 A1 | 4/2016 | Dezellem | |

OTHER PUBLICATIONS

New Zealand Patent Application No. 730824; Examination Report; dated May 24, 2018; pp. 1-5.
Australian Patent Application No. 2015333682; Office Action; dated May 15, 2018; pp. 1-3.
Extended European Search Report from European Patent Application No. 158515213 dated Apr. 13, 2018; 13 pgs.
Australian Patent Application No. 2015333682; Examination Report; dated Apr. 3, 2019.

\* cited by examiner

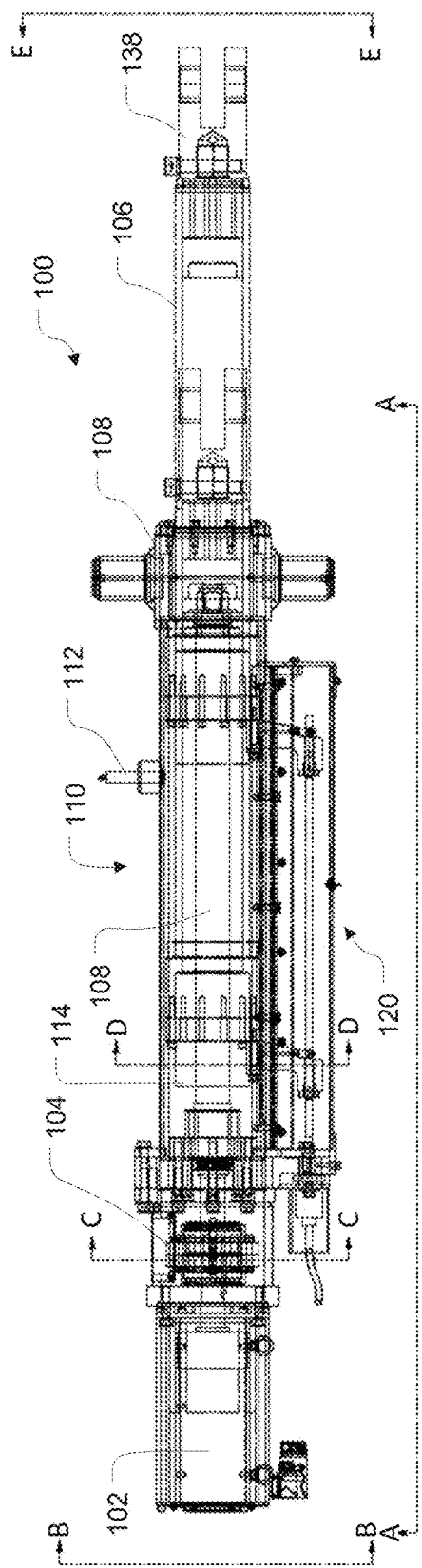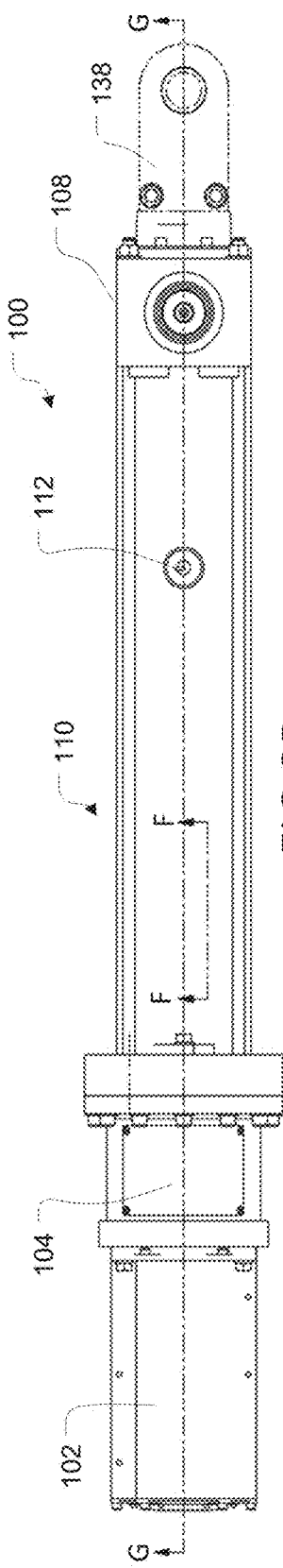
FIG 2A
FIG 2B

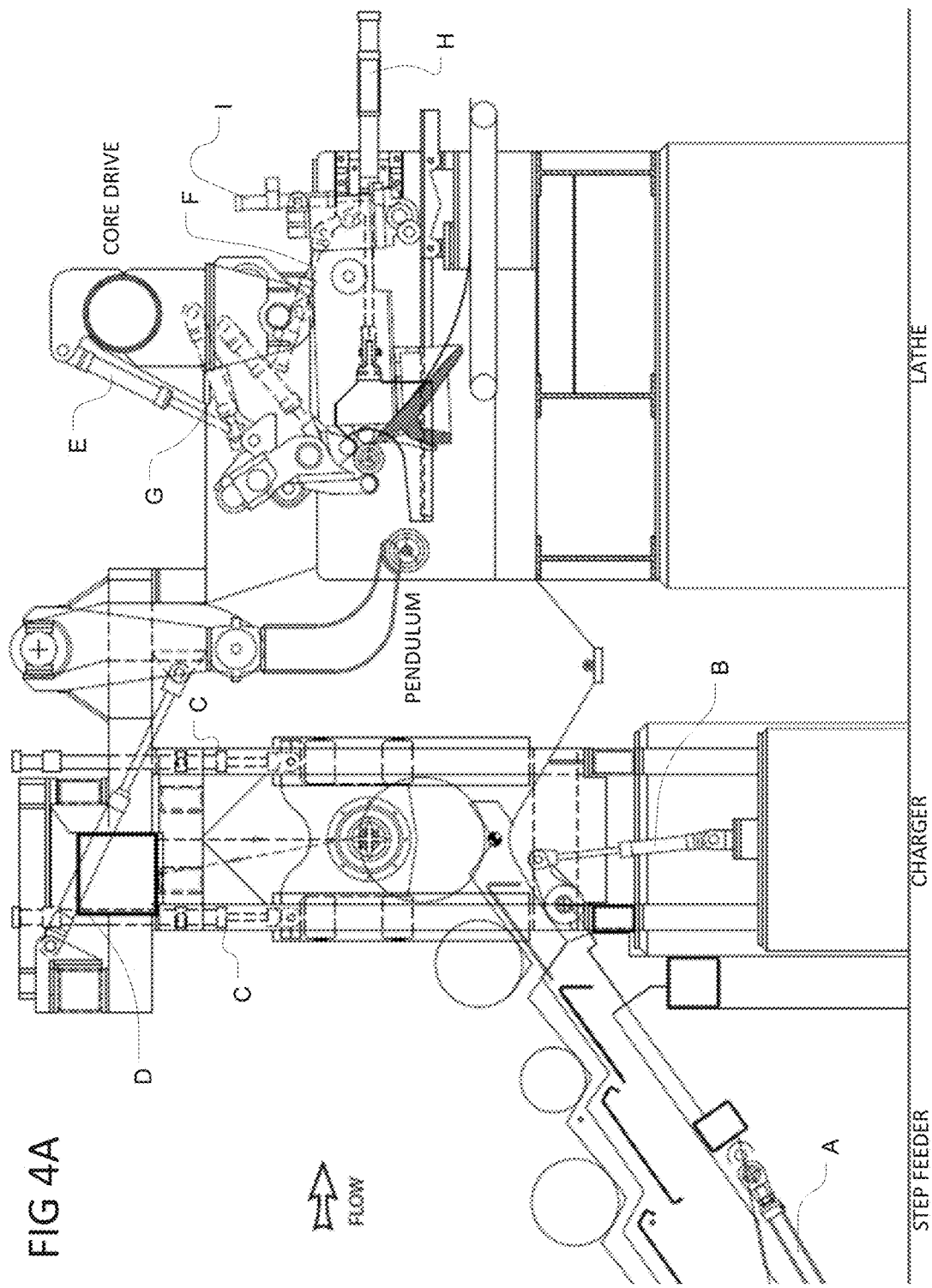

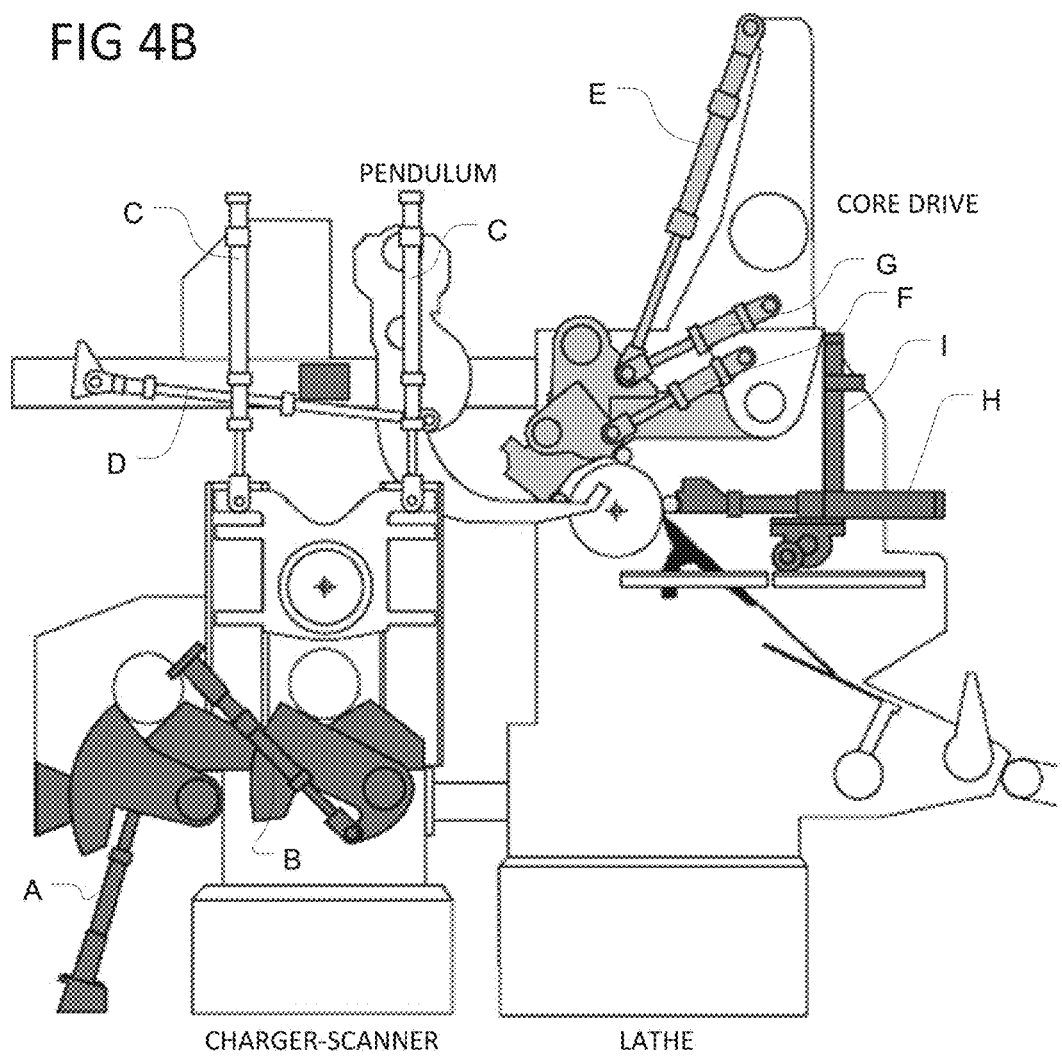

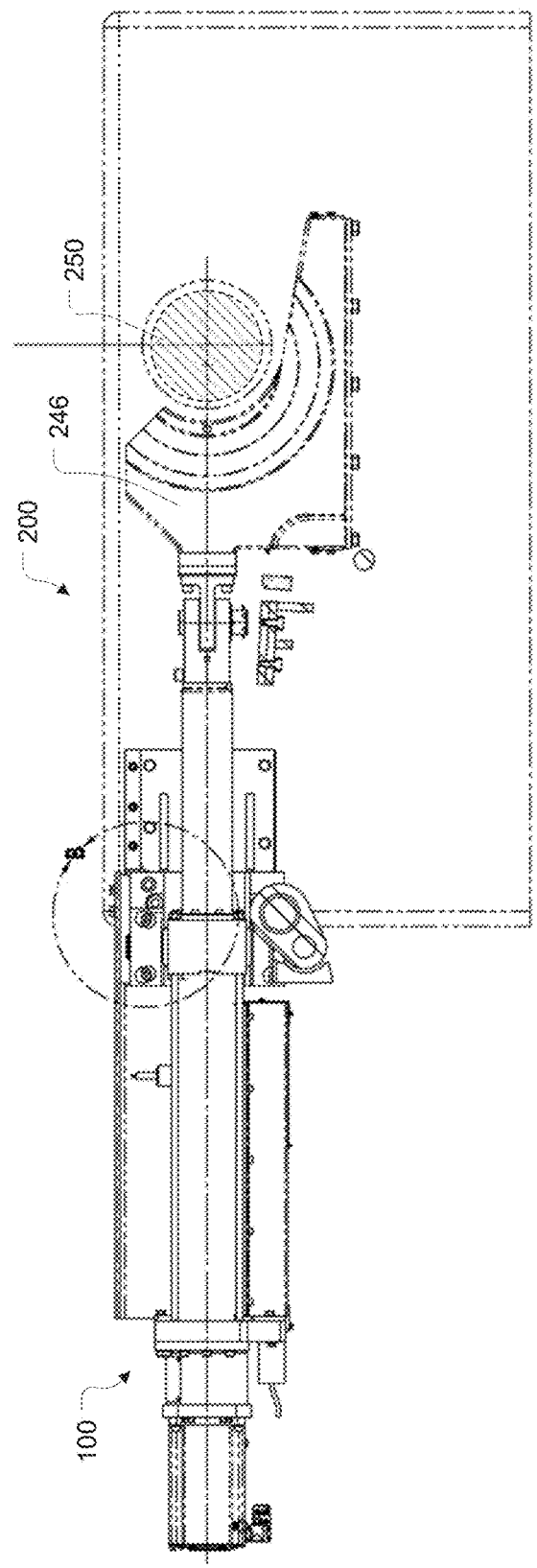
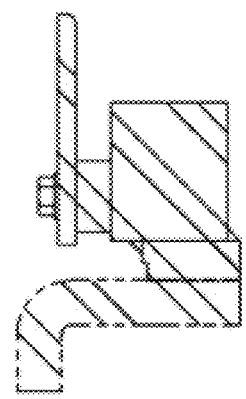
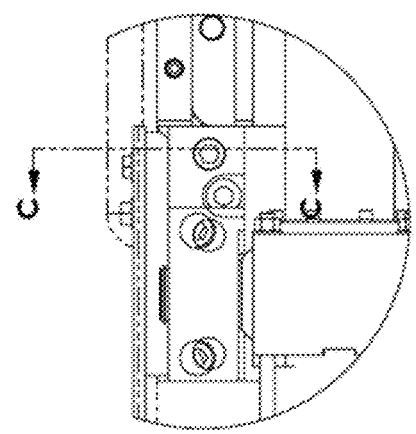
FIG 9A
FIG 9C
FIG 9B

ELECTRIC VENEER LATHE

Cross-Reference to Related Applications

This application is a divisional of U.S. patent application Ser. No. 14/882,261 filed Oct. 13, 2015, which claims the benefit of U.S. Provisional Patent Application No. 62/063,948, filed Oct. 15, 2014 and U.S. Provisional Patent Application No. 62/076,432, filed Nov. 6, 2014,both titled "Electric Veneer Lathe," the entire disclosures of which are incorporated by reference herein.

BACKGROUND

Conventional rotary veneer lathes and many other machine centers rely on hydraulic actuators for positioning of various components. For example, rotary veneer lathe carriages typically include several hydraulic cylinders that are selectively actuable to move the carriage back and forth. However, hydraulic actuators have some disadvantages. Using hydraulic fluid compression to reposition veneer lathe carriages can cause variations in peeling thicknesses, which may result in sub-standard veneer quality. The use of hydraulic systems may also present environmental concerns, such as oil leaks and soil contamination, and such systems may require frequent maintenance and repair.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 2A-2B illustrate schematic side elevational and bottom views, respectively, of an electric linear actuator;

FIGS. 4A-B illustrate schematic side elevational views of veneer lathe systems;

FIGS. 9A-9C illustrate sectional views taken along corresponding lines of FIG. 8.

DETAILED DESCRIPTION OF DISCLOSED EMBODIMENTS

Figure 1A:
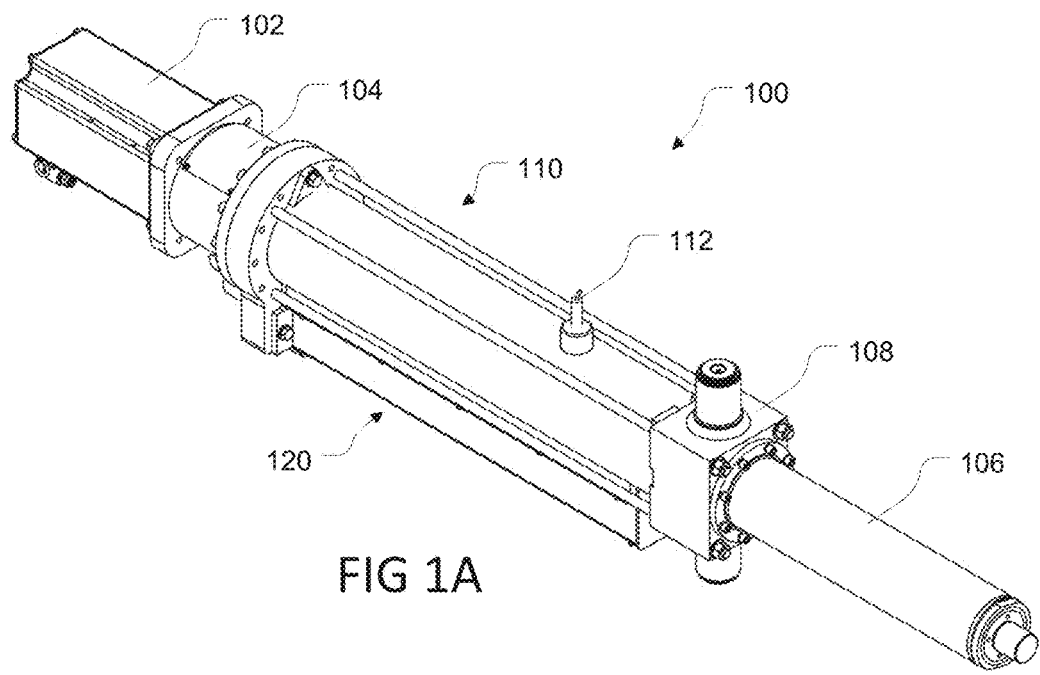
FIGS. 1A-1B illustrate perspective views of an electric linear actuator.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

In exemplary embodiments, a computing device may be endowed with one or more components of the disclosed apparatuses and/or systems and may be employed to perform one or more methods as disclosed herein.

Most conventional veneer lathes and chargers are driven by hydraulics. However, hydraulic actuation generally requires more power than actuation of electrical components. More recently, electric drive systems with roller screw mechanisms have been installed in conventional veneer lathes. In the prior electric drive systems, an electric motor drives an endless belt that is coupled with a roller screw assembly. The belt is driven in a direction generally perpendicular to the longitudinal center axis of the roller screw assembly. Thus, the motor is vertically, laterally, or vertically and laterally offset from the longitudinal center axis of the screw assembly.

One of the major disadvantages of this prior configuration is that the belt tends to fail, due in part to debris that falls onto the belt during normal operation of the veneer lathe. Another disadvantage of conventional configurations is that the offset arrangement of the motor relative to the roller screw mechanism necessitates the use of an encoder to track the position of the piston. If power is lost temporarily, the roller screw must be rotated to a terminal position in order to reset the encoder.

Finally, in many conventional veneer lathes, the carriage is positioned by a pair of actuators. Whether the actuators are hydraulic cylinders or electric actuators with offset motors, one actuator follows the other. The "master" actuator is directly controlled, and the "slave" actuator follows the master actuator. Positioning errors often arise due to lag or overshoot by the slave. Such errors can become very costly in terms of veneer quality, production speed, equipment maintenance, and downtime.

The present description provides embodiments of an electric linear actuator, a veneer lathe carriage with one or more electric linear actuators, an electric veneer lathe, and corresponding methods and systems. For clarity, the term "electric linear actuator" is used in reference to embodiments of the present disclosure, while terms such as "conventional" or "existing" are used in reference to prior actuators, whether electric, hydraulic, pneumatic, etc.

In various embodiments, an electric linear actuator may include a roller screw assembly, a motor (e.g., a servo motor) coupled to the roller screw assembly, and a linear transducer operatively coupled with the roller screw assembly. The motor may be configured to drive the roller screw assembly to extend and retract another component, such as a rod. In some embodiments, the linear transducer may be configured to detect a position of a portion of the roller screw assembly and/or an extendable rod coupled with the roller screw assembly. In some embodiments, the roller screw assembly may be coupled directly to the motor via a coupling. Optionally, the motor may be disposed generally in axial alignment with the roller screw assembly. In some embodiments, the motor is an AC servo motor coupled directly to a roller screw assembly via a gear coupling.

In various embodiments, the roller screw assembly may include a screw shaft and a nut. The nut may include a plurality of rollers arranged around, and in axial alignment with, the roller screw. The rollers, screw shaft, and/or nut may have complementary thread profiles, such that rotation of the screw shaft by the motor causes the nut to move along the screw shaft. In various embodiments, the roller screw assembly may be, or may include, a planetary roller screw.

In various embodiments, the motor may include a position sensor configured to measure degrees of rotation. In some embodiments the position sensor may be a rotary electrical transformer or rotary position transducer (e.g., a multi-turn resolver). The position sensor of the motor and/or the linear transducer may be coupled with a controller. The controller may be configured to track the position of the nut/rod based on data from the position sensor and/or the linear transducer. Optionally, the controller may be configured to use the received data to measure 'give' or backlash. In some embodiments, the controller may be configured to use the received data to determine that the electric linear actuator needs immediate maintenance, and/or to recommend a timeframe for maintenance. For example, the nut may require a small amount of clearance within the roller screw assembly. The controller may be configured to determine how much angular motion in the motor is required before the linear transducer detects a change in the position of the nut, to assess the condition of the nut (e.g., degree of wear) based on that determination, and to provide a corresponding recommendation for current or future maintenance. The provision of predictive maintenance recommendations by the controller may help to extend the useful life of the electric linear actuator. Similarly, the controller may be configured to recommend one or more adjustments to other system components based on the data.

In some embodiments the electric linear actuator may include a temperature sensor positioned to detect a temperature of the nut, the screw shaft, or both. Optionally, the temperature sensor may be an infra-red (IR) sensor. The temperature sensor may be operatively coupled to the controller. The controller may be configured to monitor the condition of the roller screw assembly based on data from the temperature sensor. The controller may also be configured to recommend and/or implement a corrective action based on the data. For example, the controller may be configured to compare a detected temperature to a desired temperature range. Based on the comparison, the controller may increase or decrease a flow of lubricant into the roller screw assembly, shut down the motor (e.g., if the temperature exceeds the upper end of the desired temperature range), recommend shutdown/maintenance, or the like.

Optionally, the controller may be operatively coupled with one or more sensors configured to detect a position of another component. The controller may be configured to control one or more electric linear actuators based at least in part on the detected position. In some embodiments, the electric linear actuators may be coupled with a controller programmed to control both of the electric linear actuators as slaves based on a "virtual master." For example, the controller may be configured to control the electric linear actuators based on the position of another component (e.g., data from an encoder on the lathe spindle). Optionally, the controller may include a secondary drive controller that is operable to synchronize the actuation of both electric linear actuators to reduce or eliminate position errors.

The threaded rollers of the roller screw assembly may provide more precise positioning than hydraulic or ball screw and nut components. The threaded rollers may also offer a larger load transfer contact surface, significantly increasing burden capacity and longer life. Coupling the motor and the roller screw design directly, rather than by way of a belt, may reduce or eliminate the loss in precision that is typical of belt-driven roller screw actuators. In comparison to conventional hydraulic actuator systems, which require a complex support system of valves, pumps and filters, embodiments described herein may be more compact, robust, and/or energy-efficient than conventional actuators. As such, embodiments of electric linear actuators may require less frequent and/or less complicated maintenance than conventional actuator systems. In various embodiments, an electric linear actuator may be provided as a replacement for an existing conventional actuator, such as a hydraulic cylinder or ball screw actuator.

Electric linear actuators may be used in a variety of applications. For example, a veneer lathe carriage may be provided with one or more one or more electric linear actuators that are collectively operable to reposition the carriage. In some embodiments, two electric linear actuators may be positioned at generally opposite ends of the carriage. In some embodiments, the electric linear actuators may be coupled with a controller programmed to control both of the electric linear actuators based at least on data received from the linear transducer and/or the position sensor of the motor. The controller may be configured to detect carriage position/skew. In various embodiments, the controller may be programmed to control the electric linear actuators as slaves, based on a virtual master geared to the position of a reference component. For example, the virtual master may be geared to the lathe spindle, such that the electric linear positioners are controlled as a function of lathe spindle position (e.g., based on data from an encoder that detects the position and/or rotational velocity of the lathe spindle). Optionally, the controller may include a programmable logic controller (PLC) and a secondary controller operatively coupled with the PLC. The electric linear actuators may be controlled by the secondary drive controller based on data from the motors, and the PLC may send instructions to the secondary drive controller based on data received from the temperature sensors and linear transducers.

Therefore, embodiments of veneer lathe carriages with electric linear actuators generally as described herein may provide more consistent peel thickness for higher quality veneer. Embodiments of a veneer lathe carriage with electric linear actuators as described herein may provide much higher cycle rates in both peel and retract functions, significantly increasing veneer production. Moreover, coupling the linear transducers (e.g., Temposonic® probes) to the knife bar may help to prevent carriage skew by effectively reporting actual knife location immediately after planned or unplanned power interruption, without the 'homing' procedure required in conventional systems after a power interruption. In various embodiments, the electric linear actuators may be configured to retract the lathe carriage at a rate of at least 20 inches per second. Optionally, the electric linear actuators may be configured to retract the lathe carriage at a rate of up to 25 inches per second, or at a faster rate. In addition, using electric linear actuators in place of conventional actuators may reduce or eliminate veneer thickness variations typically caused by varying fiber density.

In some embodiments, a method of upgrading an existing machine (e.g., a veneer lathe carriage) may include removing one or more existing actuators from the machine and operatively coupling one or more electric linear actuators with the machine. Optionally, the electric linear actuator(s) may be installed at the location formerly occupied by the existing actuator(s). Again, the electric linear actuator(s) may include a motor, a roller screw assembly directly coupled to the motor, and a linear transducer coupled with the roller screw assembly. The motor may be positioned generally in axial alignment with the roller screw assembly.

In various embodiments, an electric linear actuator may be adaptable to any brand or type of machine that has conventional linear actuators (e.g., any brand or type of veneer lathe, cutting device, conveyor, stacker, log turner, etc.). Therefore, embodiments described herein may provide a relatively simple method of upgrading an existing machine with few or no modifications to the machine other than the removal of some or all of the components of a conventional actuator. Benefits of such an upgrade may include lower horsepower requirement, less costly operation, and/or reduced maintenance.

Those with ordinary skill in the art will readily appreciate that electric linear actuators may also be used in a variety of other machines and applications. Therefore, while the present disclosure describes veneer lathe carriages with electric linear actuators by way of illustration, these examples are not intended to be limiting. Other machines with electric linear actuators, methods of upgrading other machines to replace conventional actuators with electric linear actuators, and corresponding methods of use are specifically contemplated herein.

Figure 1B:
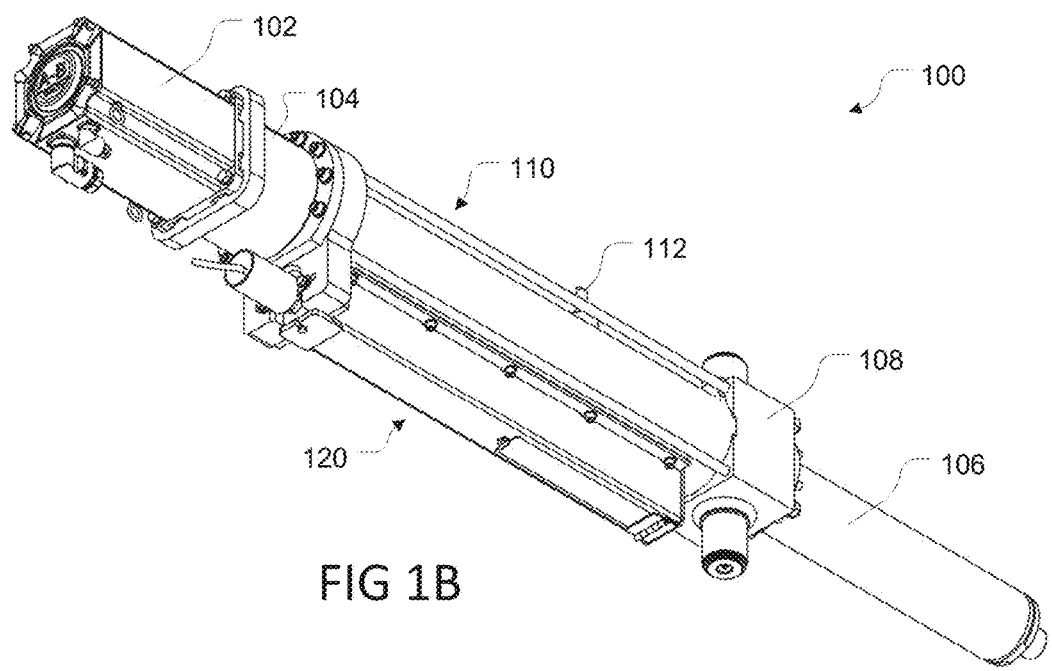

FIGS. 1A-1B illustrate perspective views of an electric linear actuator 100, in accordance with various embodiments. Electric linear actuator 100 may include a motor 102, a roller screw assembly 110, and a linear transducer assembly 120. Motor 102 may be coupled with a proximal end of roller screw assembly 110 by a coupler 104. A rod assembly 106 may be coupled with a distal end of roller screw assembly 110. Roller screw assembly 110 and/or rod assembly 106 may be at least partially contained within a housing 108. Linear transducer assembly 120 may be coupled to roller screw assembly 110. Optionally, linear transducer assembly 120 may be positioned below roller screw assembly 110 generally between motor 102 and a distal end of the electric linear actuator 100. Optionally, a temperature sensor 112 may also be coupled to roller screw assembly 110. In some embodiments, linear transducer assembly 120 and temperature sensor 112 may be disposed on opposite sides of roller screw assembly 110.

In various embodiments, motor 102 may be a servo motor. In some embodiments motor 102 may be an A/C servo motor with an encoder/resolver and a servo drive. Alternatively, motor 102 may be any other suitable electric motor.

Coupler 104 may be a gear coupling. In some embodiments, coupler 104 may be a double engagement, close coupled type of gear coupling (e.g., FALK™ Type G20). In other embodiments, coupler 104 may be a gear-type flexible coupling, a universal joint, or any other suitable type of shaft coupling.

In various embodiments, roller screw assembly 110 may be a planetary roller screw assembly. Alternatively, roller screw assembly 110 may be a conventional and/or commercially available roller screw mechanism or suitable substitute thereof. Roller screw assembly 110 may be in axial alignment with motor 102 and rod assembly 106.

In some embodiments, temperature sensor 112 may be an infra-red (IR) temperature sensor. In other embodiments, temperature sensor 112 may be any other suitable type of temperature sensor. Some embodiments may lack temperature sensor 112. Embodiments of roller screw assembly 110 and linear transducer assembly 120 are described in further detail below.

Figure 3A:
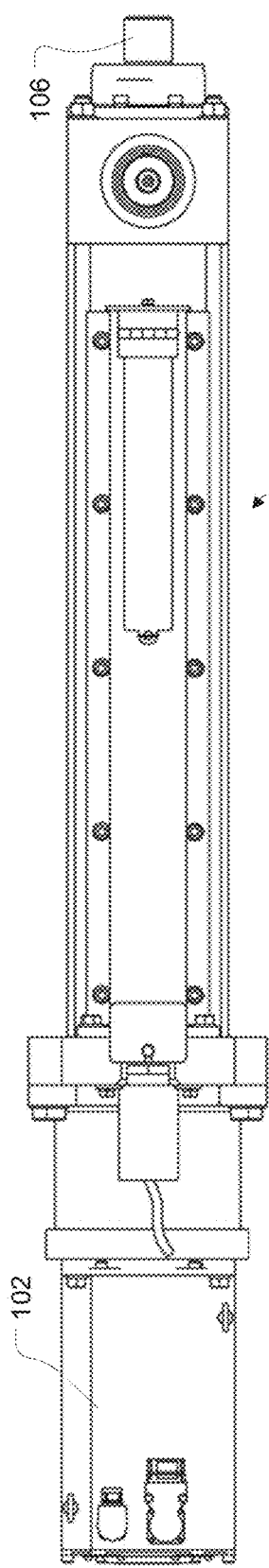
FIGS. 3A-3G illustrate sectional views taken along corresponding lines of FIGS. 2A-2B.
Figure 3F:
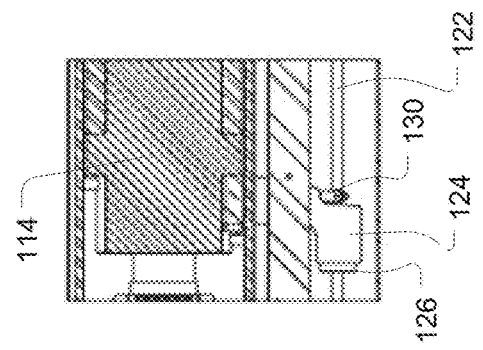
Figure 3E:
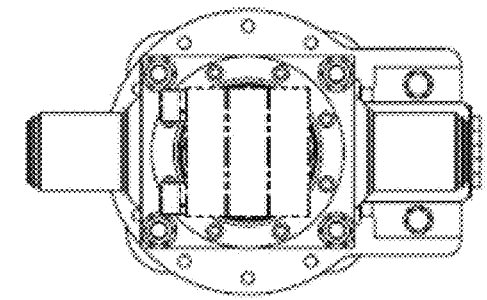
Figure 3D:
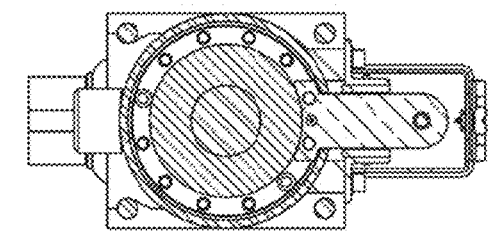
Figure 3C:
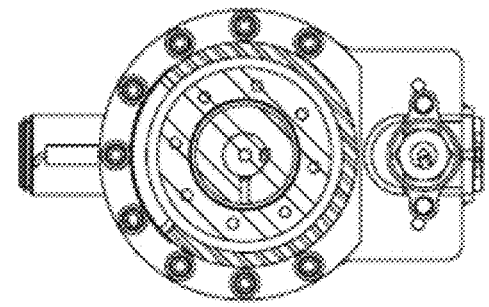
Figure 3B:
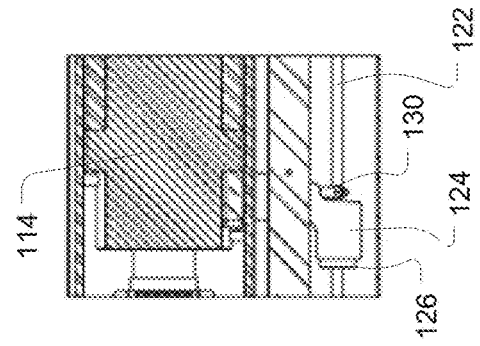
Figure 3G:
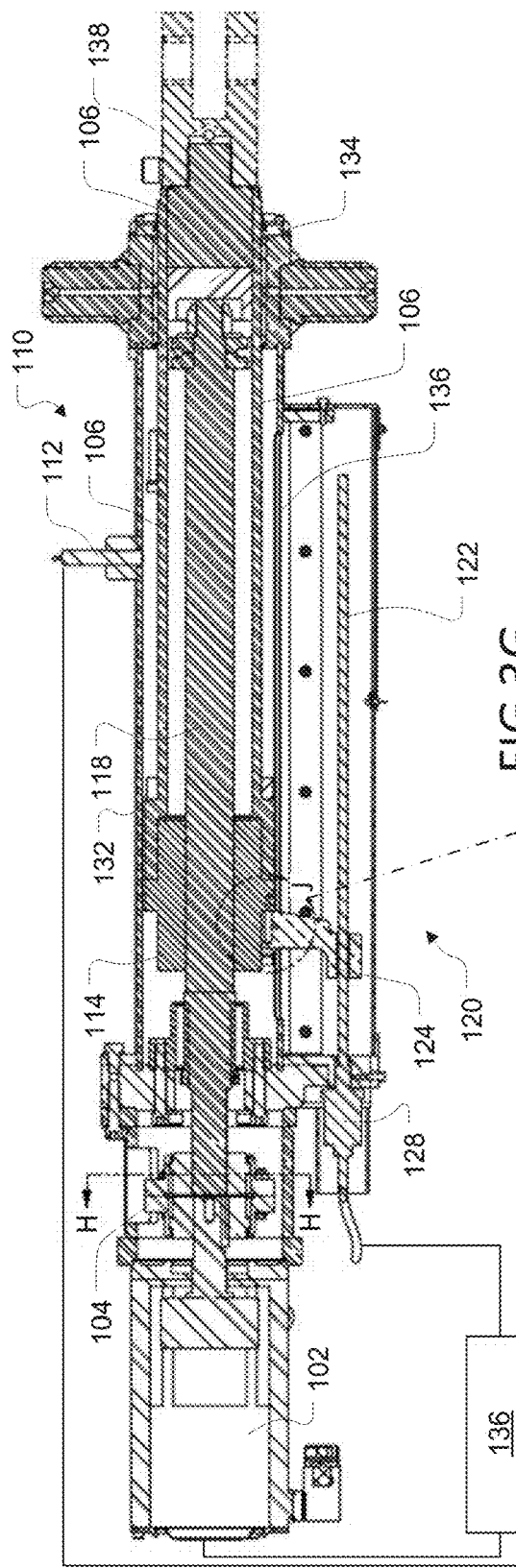
Figure 3J:
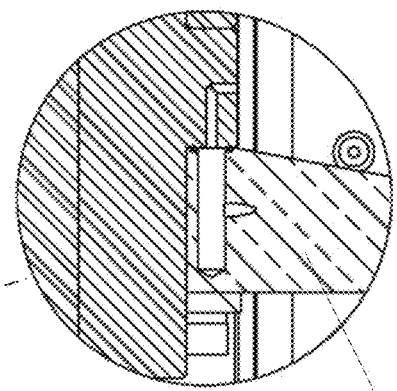
FIGS. 3H and 3J illustrate sectional views taken along corresponding lines of FIG. 3G.
Figure 3H:
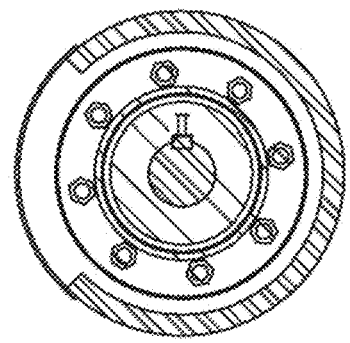
Figure 3K:
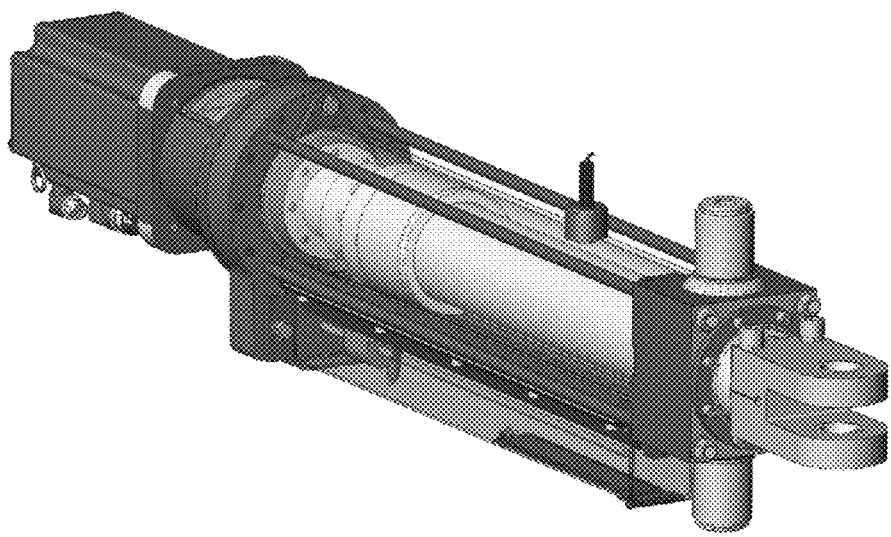
FIGS. 3K-L illustrate schematic three-dimensional and sectional views of an electric linear actuator.
Figure 3L:
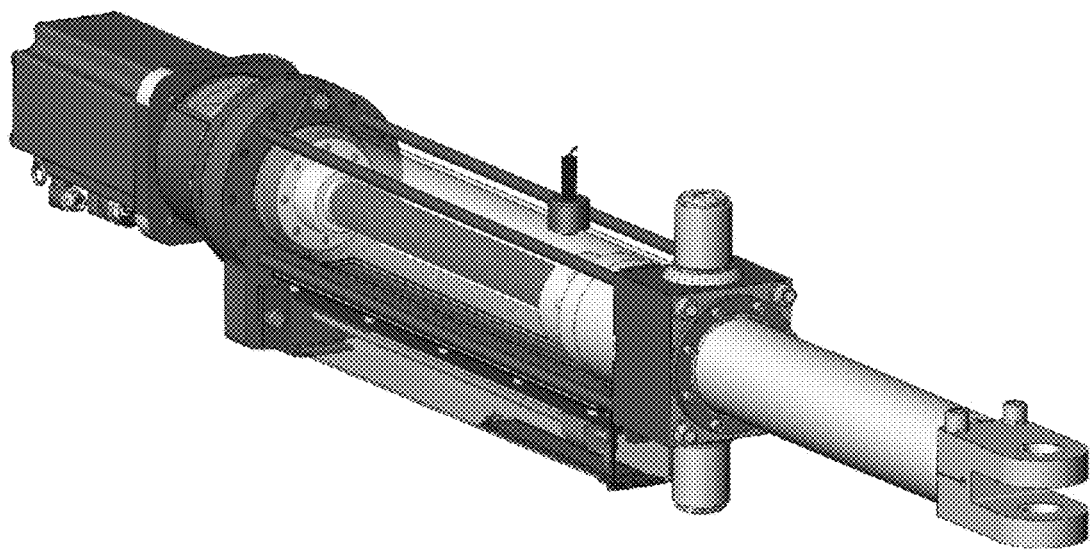

FIGS. 2A-2B illustrate schematic side elevational and plan views, respectively, of an electric linear actuator, in accordance with various embodiments. FIGS. 3A-3G illustrate sectional views taken along corresponding lines of FIGS. 2A-2B, FIGS. 3H and 3J illustrate sectional views taken along corresponding lines of FIG. 3G, and FIGS. 3K-L illustrate perspective views of an electric linear actuator, all in accordance with various embodiments. For clarity, FIG. 3A illustrates a sectional view taken along line A-A of FIG. 2A, FIG. 3B illustrates a sectional view taken along line B-B of FIG. 2A, and so on.

Roller screw assembly 110 may be operable to convert rotary motion from motor 102 into linear motion to extend and retract another component, such as a rod, as shown for example in FIG. 2A (extended and retracted positions of rod assembly 106 indicated in broken lines). Referring now to FIG. 3G, which shows a side cutaway view of electric linear actuator 100, roller screw assembly 110 may include a nut 114 and a screw shaft 118 disposed through nut 114. Nut 114 may include a plurality of rollers arranged around, and in axial alignment with, screw shaft 118. The rollers, screw shaft 118, and/or nut 114 may have complementary thread profiles, such that rotation of the screw shaft by the motor causes the nut 114 to move along screw shaft 118 to extend and retract rod assembly 106. In various embodiments, roller screw assembly 110 may be, or may include, a planetary roller screw assembly. Roller screw assemblies are known in the art and, as such, will not be described further herein.

Optionally, roller screw assembly 110 may include one or more bumpers 132 configured to reduce impact force or jarring of nut 114 when roller screw assembly is fully extended. Likewise, roller screw assembly 110 may include a bumper 134 configured to reduce impact force or jarring of nut 114 when roller screw assembly is fully retracted.

Referring still to FIG. 3G, linear transducer 120 may include sensor rod 122, key block 124, magnet 126 (FIG. 3F), and sensor 128. Sensor rod 122 may be coupled with nut 114 via key block 124. Magnet 126 may be mounted to key block 124, and sensor 128 may be coupled with a proximal end of sensor rod 122. Sensor rod 122 may be disposed through magnet 126 and key block 124, and key block may be operatively coupled with the roller screw assembly. Magnet 126 and key block 124 may be slidable along sensor rod 122.

In various embodiments, sensor 122 may be a magnetostrictive linear position sensor. For the purposes of this description, a magnetostrictive linear position sensor is a sensor that measures the distance between a position magnet (e.g., magnet 126) and one end of a sensor rod (e.g., sensor rod 122). In a particular embodiment, linear transducer 120 is a Temposonics® linear position sensor (MTS Systems Corporation). In other embodiments, linear transducer 120 may be another magnetostrictive linear position sensor, a non-magnetostrictive linear position sensor, or any other suitable type of linear position sensor.

As best shown in FIG. 2A, the rotation of screw shaft 118 by motor 102 may cause nut 114 to move along screw shaft 118, which may cause extension or retraction of rod assembly 106 depending on the direction of rotation. As nut 114 moves along screw shaft 118, key block 124 and magnet 126 may move along sensor rod 122. Sensor 128 may detect a strain pulse induced in a magnetostrictive waveguide (e.g., in sensor rod 122) by the interaction between the magnetic field of magnet 126 and an interrogation current pulse applied along the waveguide. Sensor 128 may be configured to detect the position of magnet 126 as a function of elapsed time between the application of the interrogation pulse and detection of the corresponding strain pulse.

Sensor 128 may be operatively coupled with motor 102 and/or a controller 136 (FIG. 3G). In some embodiments, motor 102 may include a multi-turn resolver or absolute encoder, or other type of position sensor configured to measure degrees of rotation. Motor 102 and/or controller 136 may be configured to receive data from linear transducer 120 and to determine a position of rod assembly 106 based on the received data.

Optionally, controller 136 may be configured to track the position of the nut/rod based on data from the position sensor and/or the linear transducer. In some embodiments, controller 136 may be configured to use the received data to measure 'give' or backlash (e.g., based on the difference between an expected position of the nut/rod and the actual position of the nut/rod). In addition, controller 136 may be configured to use the received data to determine that the electric linear actuator needs immediate maintenance, and/or to recommend a timeframe for maintenance. For example, controller 136 may be configured to determine how much angular motion in motor 102 is required for linear transducer 120 to detect a change in the position of nut 114. Based on that determination, controller 136 may assess the condition of nut 114 (e.g., degree of wear) and provide a corresponding recommendation for current or future maintenance. The provision of predictive maintenance recommendations by controller 136 may help to extend the useful life of the electric linear actuator 100. Similarly, controller 136 may be configured to recommend one or more adjustments to other system components based on the data from the position sensor, linear transducer, and/or other sensors.

Temperature sensor 112 may be positioned to detect a temperature of nut 114 and/or roller screw 118. For example, in the embodiment shown in FIG. 3G, temperature sensor 112 is positioned to detect a temperature of nut 114 when nut 114 is near the location of temperature sensor 112, and to detect a temperature of roller screw 118 when nut 114 is further from temperature sensor 112. Optionally, temperature sensor 112 may be operatively coupled to controller 136, and the controller may be configured to monitor the condition of the roller screw assembly 110 based at least in part on data from the temperature sensor 112. The controller may also be configured to recommend and/or implement a corrective action based on the data. For example, the controller may be configured to compare a detected temperature to a desired temperature range. Based on the comparison, the controller may increase or decrease a flow of lubricant into the roller screw assembly (e.g., through grease fitting 130), shut down the motor (e.g., if the temperature exceeds the upper end of the desired temperature range), or make recommendations to an operator regarding maintenance. The controller may be provided with an interface configured to display parameters such as backlash, temperature of the nut/roller screw, recommendations, and the like.

Electric linear actuators may be used in a variety of applications in place of conventional actuators such as hydraulic cylinders. For example, a veneer lathe system may be provided with one or more one or more electric linear actuators that are collectively operable to reposition various components of the system.

FIGS. 4A-B illustrates schematic side elevational views of veneer lathe systems, each including a charger-scanner and a veneer lathe. The charger-scanner includes a charger, a scanner, and a pendulum. Typically the lathe includes a core drive with at least one roller bar that provides motive force to rotate the log, a knife bar assembly mounted on a carriage that is movable toward and away from the rotational axis of the log, and spindles that engage the opposite end of the log. In some lathes the spindles may also provide rotational force, while other lathes may lack spindles.

In operation, logs are fed in succession to the charger-scanner by a log ladder, step feeder, or the like. The log is rotated by the charger within the field of view of the scanner, which collects geometric measurements and/or other data. Based on the scan data, the log is repositioned by the charger to an optimal orientation for peeling. The log is transferred to the lathe in that orientation by the pendulum. The lathe rotates the log in the desired orientation. As the log is rotated, the knives are brought into contact with the outer surface of the log to peel the log. As the diameter of the log decreases, the positions of the carriage and roller bar(s) and the rotational angle (i.e., pitch) of the knives are adjusted as required to continue the peeling process.

The moving components of these devices are operated by corresponding actuators. For example, in the illustrated systems, actuators A and B are operated to move logs up the log ladder or step feeder and onto the charger, respectively. Actuators C raise the log for scanning and actuator D moves the pendulum. Actuators E, F, and G of the core drive are operated to reposition the roller bar(s). Actuators H are operated to move the carriage forward and backward, and actuator I is operated to adjust the pitch of the knives. The number and configuration of actuators varies among lathe systems. Regardless, precise and coordinated operation of the system's moving components is required to obtain good quality veneer of substantially uniform thickness.

In conventional veneer lathe systems, these actuators are typically hydraulic actuators. Hydraulic actuators are relatively expensive to operate and maintain. They are also prone to backlash and can produce variable peeling thicknesses. Off-set belt actuators with ball screw drives, in which the motor and ball screw are vertically or horizontally parallel and connected by a belt, have also been used to drive lathe carriages. This type of actuator may be prone to belt failures, and requires a rehoming procedure after a power interruption.

Electric linear actuators as described herein may be used instead of, or as replacements for, conventional actuators in a variety of applications. In the context of veneer lathe systems and veneer production facilities, electric linear actuators may be used to selectively reposition moving components of log ladders, step feeders, charger-scanners, lathes, and/or other devices. By way of example, FIGS. 5-9C illustrate a veneer lathe carriage 200 with electric linear actuators 100, in accordance with various embodiments.

Figure 5:
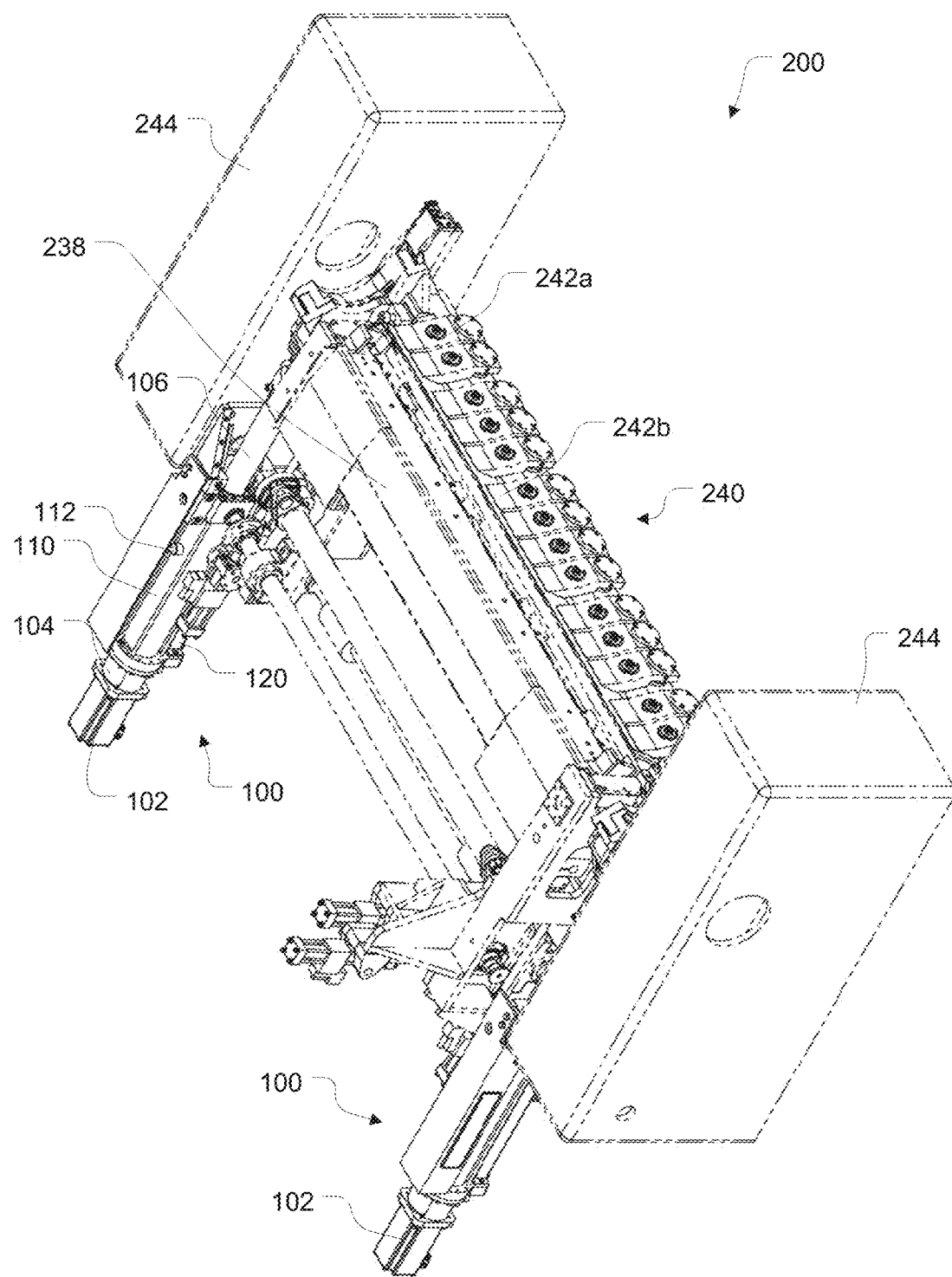
FIG. 5 illustrates a perspective view of a veneer lathe carriage with electric linear actuators.

Referring first to FIG. 5, a veneer lathe carriage 200 may include a base 238 configured to support a knife bar assembly 240 with a plurality of knives 242. In some embodiments, knives 242 may include knife clamps 242a configured to secure a blade 242b against a backing plate or other component of knife bar assembly 240. In other embodiments, blade 242b and knife clamp 242a may be integral. In any case, each of the knives 242 may have a cutting edge, and the knives may be arranged with the cutting edges aligned along an axis. Knife bar assembly 240 may be coupled with, and movable relative to, a frame 244 of a lathe. In various embodiments, carriage 200 may include two electric linear actuators 100 coupled with frame 244 with brackets or other fasteners. Electric linear actuators 100 may be positioned at generally opposite ends of knife bar assembly 200.

Figure 6A:
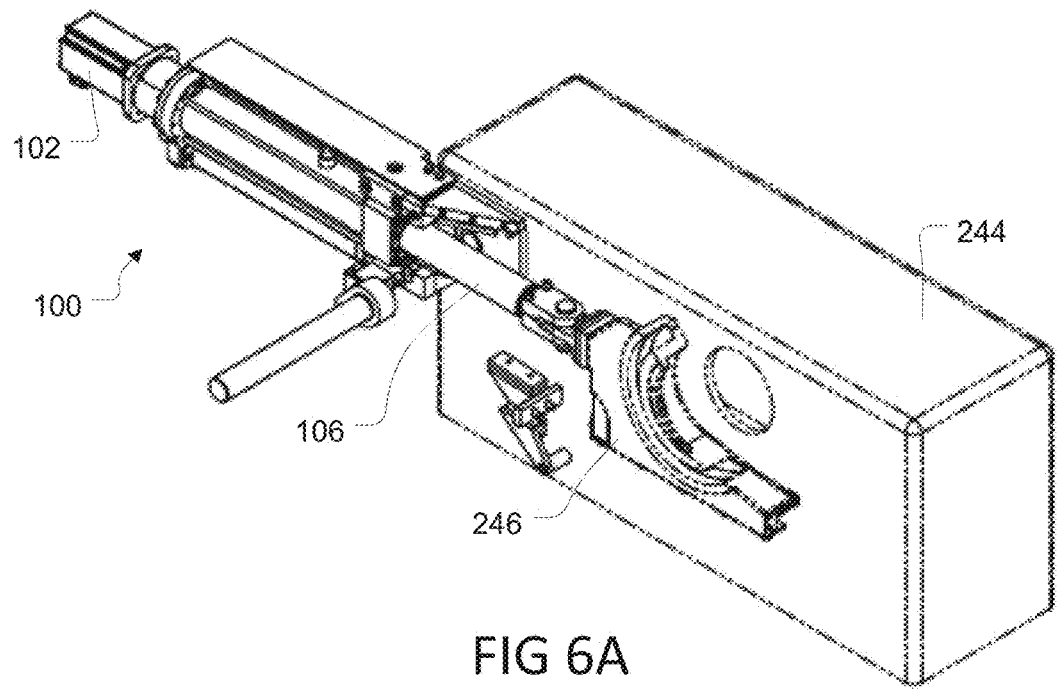
FIGS. 6A-6B illustrate partial perspective views of the veneer lathe carriage of FIG. 5.
Figure 6B:
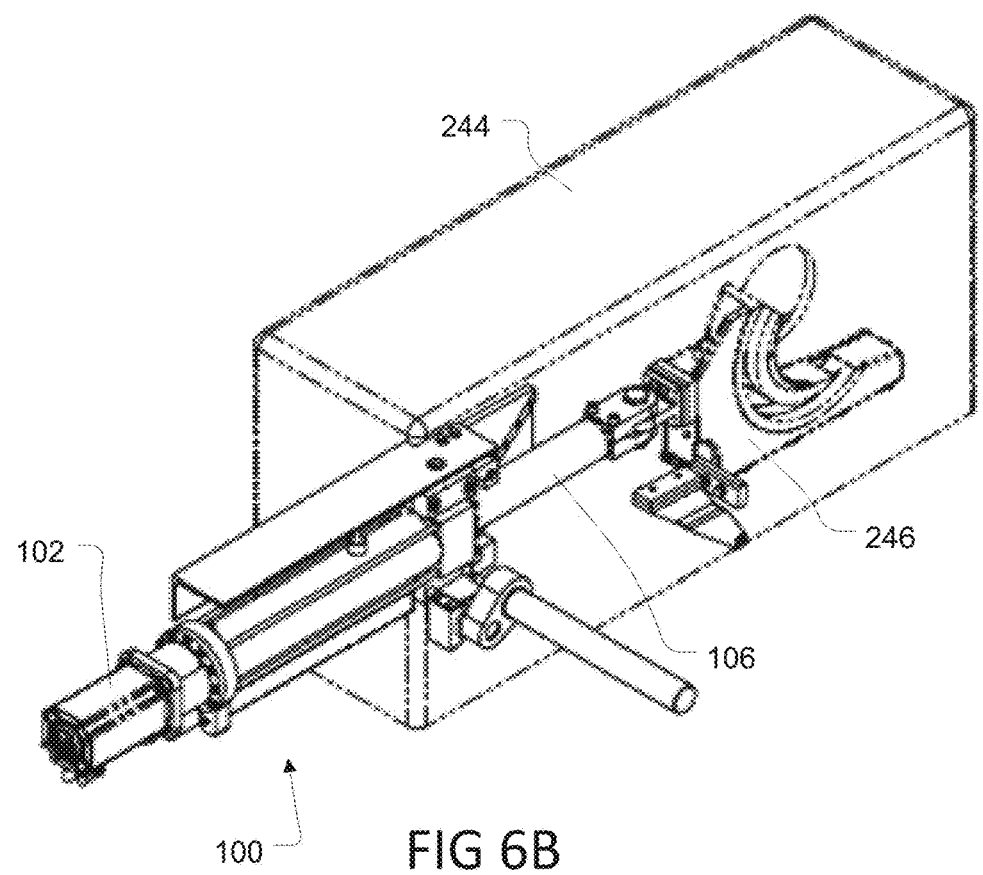

In some embodiments, the linear transducers may be coupled to the knife bar assembly 240 to allow detection of carriage skew and effective reporting of the actual locations of the knives 242 immediately following planned or unplanned power interruptions. For example, as best shown in FIGS. 6A-B, the distal end of the each rod 106 may be pivotably coupled to a corresponding trunnion 246, and the trunnions 246 may be coupled to corresponding opposite sides of the knife bar assembly 240.

Other configurations are also possible, and electric linear actuators as described herein may be used in place of hydraulic and other conventional actuators on a variety of lathe carriages.

In some embodiments, electric linear actuators 100 may be coupled with a controller 236. Again, each of the motors 102 may include a position sensor (e.g., a multi-turn absolute encoder or resolver) configured to detect rotational position/degrees of rotation. Controller 236 may be configured to control motors 102 (and thus the position of the carriage) based on data from the position sensors of motors 102, linear transducers 120, and/or one or more other sensors (e.g., vision sensors positioned to detect the carriage or knives).

Figure 7:
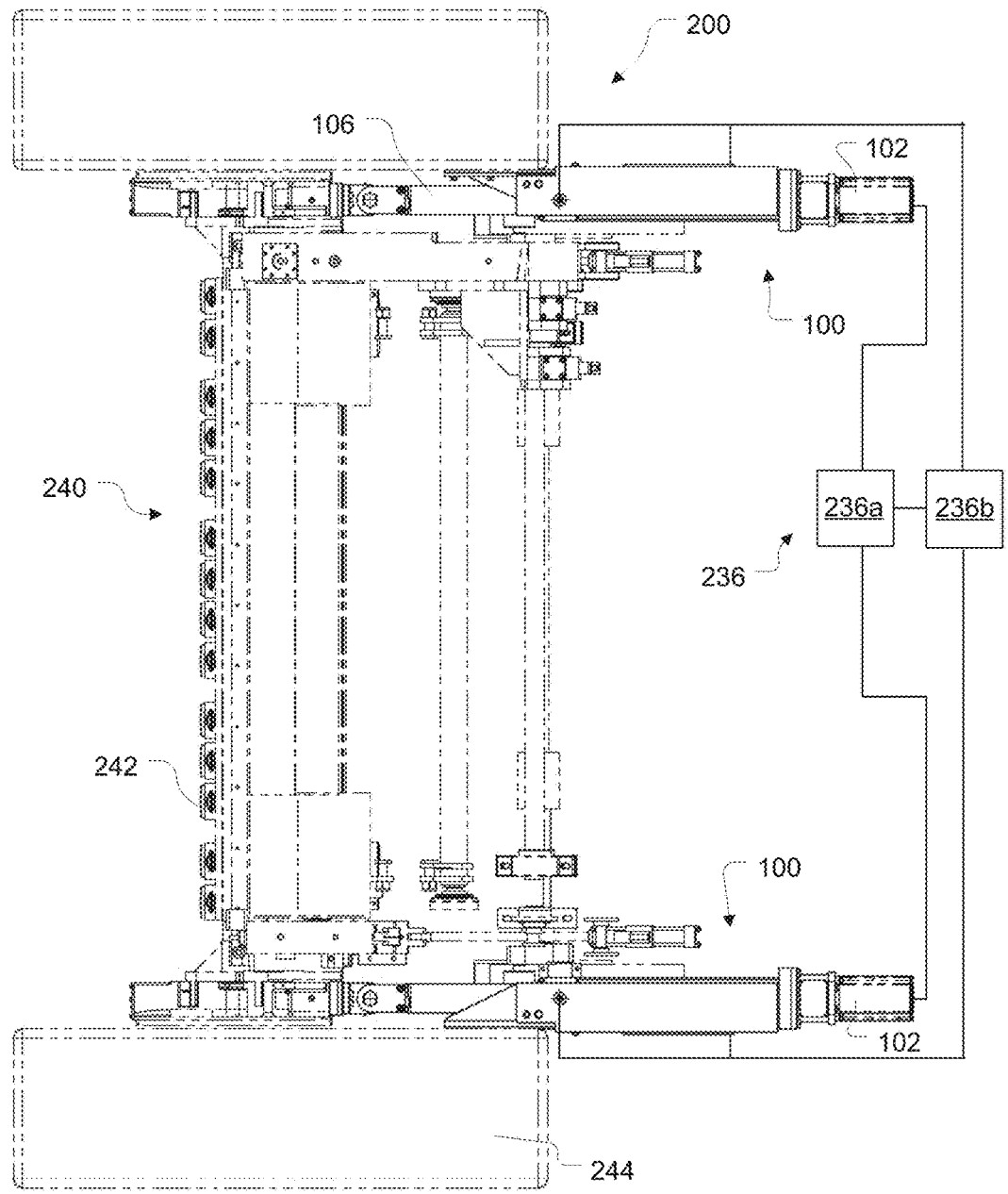
FIG. 7 illustrates a plan view of a veneer lathe carriage with electric linear actuators.
Figure 8:
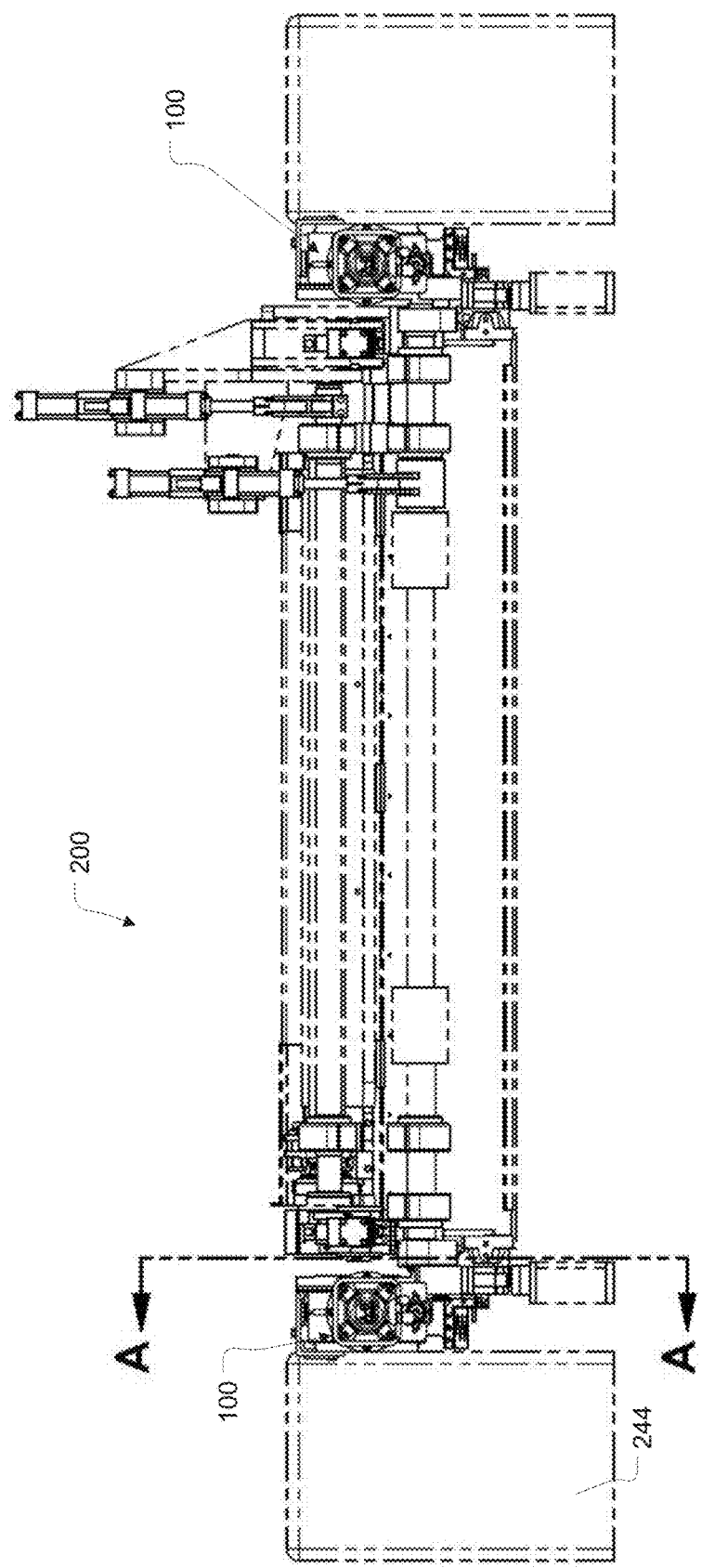
FIG. 8 illustrates a front elevational view of a veneer lathe carriage with electric linear actuators.

Optionally, as shown by way of example in FIG. 7, controller 236 may include a secondary drive controller 236a and a primary controller 236b (e.g., a PLC) in electronic communication. Secondary drive controller 236 may receive data from the position sensors of the motors 102. Secondary drive controller 236a may be configured to detect the position of the knives 242 based on the data from the position sensors (e.g., rotational angle, rotational direction, and number of revolutions) and to control motors 102 based at least in part on instructions from primary controller 236b.

Primary controller 236b may receive data from the linear transducers 120 and temperature sensors 112. Primary controller 236b may be configured to determine the position of the carriage/knives based on the data from the linear transducers 120. For example, primary controller 236b may be configured to determine the position of knives 242 based on the positions of the nuts 114. In this example, linear transducers 120 are used as a redundant position detection system, allowing the carriage position to be tracked even if one or both motors 102 becomes uncoupled from the roller screw assembly 110, the motor's position sensor fails, or the secondary drive controller 236a is removed or becomes inoperable.

One or both of primary controller 236b and secondary drive controller 236a may be configured to detect carriage skew as well as knife position. For example, skew may be detected by comparing the detected positions of the nuts 114 or the rotational angle of the screw shafts 118. A difference between the positions/angles may be an indication that one of the rods 106 is extended to a greater distance than the other, resulting in skew. In response to detecting such a difference, the primary controller 236b and/or secondary drive controller 236a may operate one or both motors 102 to correct the difference, instruct the motors 102 to cease operation, generate a maintenance recommendation, and/or generate an audible or visual alert.

Optionally, primary controller 236b may be configured to monitor the condition of various components, make recommendations for maintenance, and/or halt operation of the linear transducers 100 based on received data. For example, primary controller 236b may monitor wear in nuts 114 based on data received from the secondary drive controller 236a and/or the linear transducers 120, such as by tracking the number of revolutions of the motor per increment of distance traveled by the corresponding nut over time. As another example, primary controller 236b may monitor the condition of screw shafts 118 and/or nuts 114, or other components of the electric linear actuators 100, based on temperature data received from temperature sensors 112. An increase in detected temperature above a predetermined maximum threshold, a difference between the temperatures detected by the two temperature sensors for a given time point, or a particular pattern of temperature fluctuation may be indications of wearing or malfunction in one or more components. Based on the monitored parameters, primary controller 236b may be configured to generate a maintenance recommendation and/or instruct the secondary drive controller 236b to stop the electric linear actuators to limit damage to the carriage or other components.

The above functions and others may be distributed among secondary drive controller 236a and primary controller 236b in a variety of different ways. Alternatively, controller 236 may be a single controller (e.g., a PLC) operable to perform some or all of the functions of secondary drive controller 236a and primary controller 236b.

In some embodiments, controller 236 may be configured to control one electric linear actuator 100 based on another, such that one actuator is the "master" and the other is the "slave." In other embodiments, controller 236 may be programmed to control both of the electric linear actuators 100 as slaves based on a "virtual master." The virtual master may be a representation of the position or speed of another component.

Figure 10:
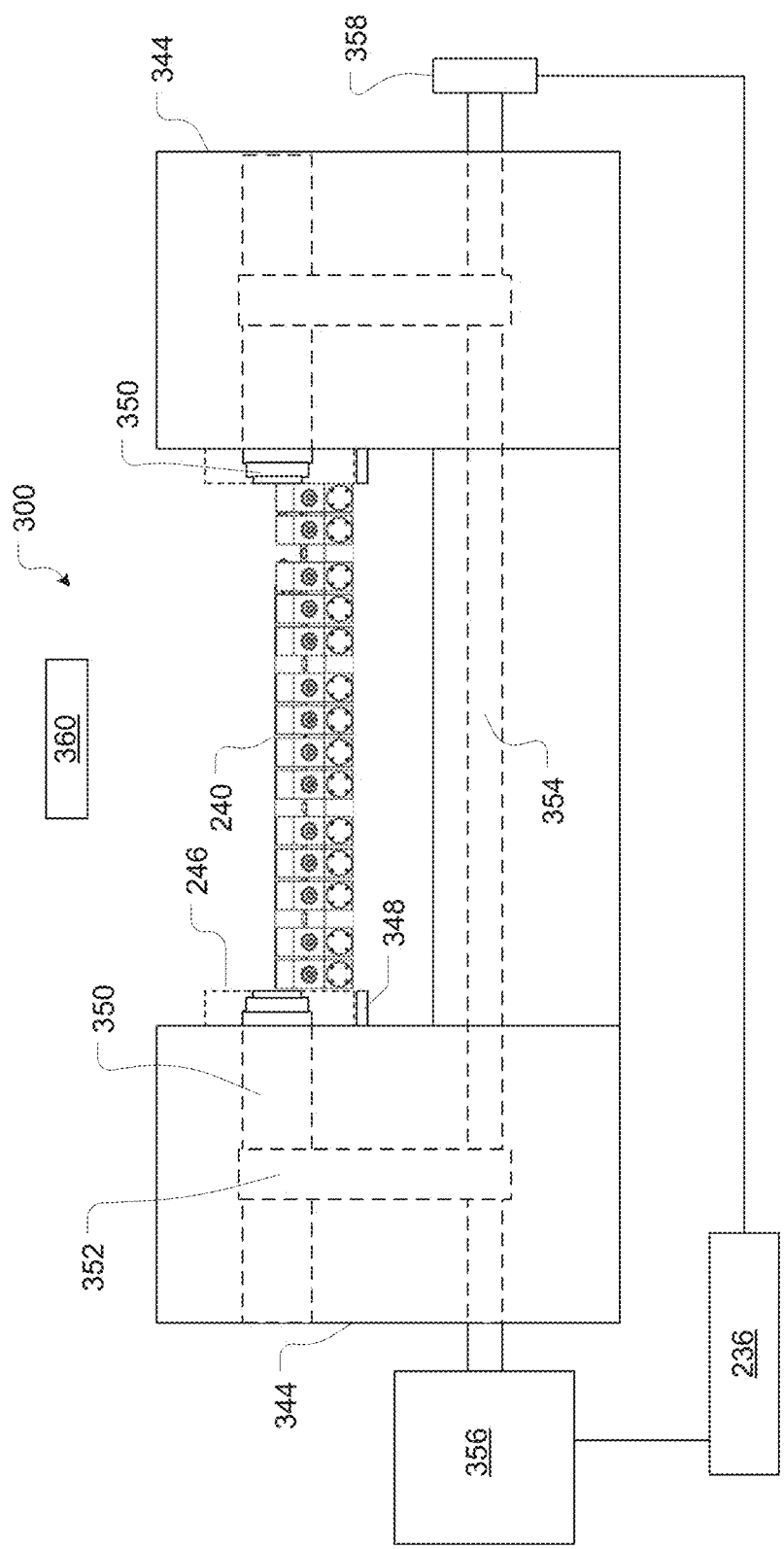
FIG. 10 shows a schematic front elevational view of components of a veneer lathe, all in accordance with various embodiments.

For example, the virtual master may be functionally geared to the rotational speed of the lathe spindles. FIG. 10 shows a schematic front elevational view of various components of a lathe 300. The lathe spindles 350 may be disposed through corresponding holes in the lathe frame 344 (see e.g., FIGS. 5 and 6A-B) and coupled with a drive shaft 354 by corresponding belts 352. Drive shaft 354 may be coupled to a motor 356 operable to rotate the drive shaft. An encoder 358 may be disposed within motor 356, positioned along drive shaft 354, or otherwise operatively coupled with one of the lathe spindles 350. Controller 236 may be configured to control the electric linear actuators 100, and thus the forward and backward movement of the carriage, based at least in part on data from encoder 358 and/or data from one or more vision sensors 360 positioned to detect the position of the carriage, knives, or other lathe component. Because linear transducers 120 are coupled to the knife bar assembly 240 via nuts 114, rods 106, and trunnions 246, electric linear actuators 100 may enable the actual knife location to be determined immediately after a power interruption without the 'homing' procedure required in conventional systems. In various embodiments, electric linear actuators 100 may be configured to retract the veneer lathe carriage 200 at a rate of up to 25 inches per second or more. In addition, substituting electric linear actuators 100 for conventional actuators may reduce or eliminate the backlash typically caused by varying fiber density.

In various embodiments, an electric linear actuator may be provided as a replacement for an existing conventional actuator, such as a hydraulic cylinder or ball screw actuator. Thus, a method of upgrading an existing machine (e.g., a veneer lathe carriage) may include removing one or more conventional actuators from the machine and operatively coupling one or more electric linear actuators with the machine. Optionally, the electric linear actuator(s) may be installed at the location formerly occupied by the conventional actuator(s) with little or no modification of the remaining components of the machine. In some embodiments, the method may further include coupling a controller with the electric linear actuator(s), the motor, an optical sensor/scanner, a temperature sensor, and/or another position sensor. In various embodiments, the controller may include a programmable logic controller (PLC), a secondary drive controller, or both.

In other embodiments electric linear actuators can be used instead of (or as replacements for) conventional linear actuators, such as hydraulic or offset-belt ball screw actuators, to reposition other components of veneer lathe systems, including (but not limited to) components of log ladders/feeders, chargers, pendulums, core drives, roller/pressure bars, to adjust knife pitch or height, and the like. Similarly, electric linear actuators can be used instead of (or as replacements for) conventional linear actuators to move other machines or machine components. For example, electric linear actuators may be used in place of hydraulic cylinders or other conventional linear positioners in presses, log turners, slabbers/canters, saws, chippers, profilers, positioning infeeds, positioning pins, stackers, and/or in any other suitable application.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein.

Therefore, it is manifestly intended that embodiments be limited only by the claims and the equivalents thereof.

What is claimed is:

1. A veneer lathe system comprising:
    a carriage having a base and a knife bar assembly mounted on the base, wherein the knife bar assembly is configured to retain one or more knives; and
    a pair of electric linear positioners pivotably coupled to respective opposite ends of the knife bar assembly, each of the electric linear positions of said pair having
        a roller screw assembly, wherein the roller screw assembly includes a nut and a screw shaft disposed through the nut,
        an electric motor coupled to a proximal end of the roller screw assembly and in axial alignment with the roller screw assembly, the electric motor having a rotary position sensor operable to detect a rotational position of the screw shaft, and
        a linear position sensor coupled to the roller screw assembly, wherein the linear position sensor is configured to detect a position of the nut,
        wherein the electric linear positioners are selectively actuable to reposition the carriage along a feed path; and
    a controller configured to
        detect skew of the carriage assembly based on data received from the linear position sensors of the rotary position sensors, and
        operate one or both of the electric motors to correct the detected skew.

2. The veneer lathe system of claim 1, wherein said roller screw assembly includes a planetary roller screw.

3. The veneer lathe system of claim 1, wherein said roller screw assembly includes a temperature sensor configured to detect a temperature of the nut or the screw shaft.

4. The veneer lathe system of claim 1, wherein the linear position sensors are magnetostrictive linear position sensors.

5. The veneer lathe system of claim 1, wherein each of the electric motors is a servo drive and the rotary position sensors are encoders or resolvers, and the controller is operatively coupled with the linear position sensors and the encoders or resolvers and configured to actuate the electric linear actuators synchronously to thereby move the carriage assembly along the feed path.

6. The veneer lathe system of claim 5, wherein the controller is configured to operate the electric linear positioners based at least in part on a position or rotational speed of a reference component.

7. The veneer lathe system of claim 6, wherein the reference component is a drive shaft of a lathe spindle, and the controller is operatively coupled with an encoder positioned to detect the rotary speed of the lathe spindle.

8. The veneer lathe system of claim 5, wherein the controller is configured to estimate an amount of wear in the nuts based at least on data from the linear position sensors and the corresponding encoders or resolvers.

9. The veneer lathe system of claim 8, wherein the controller is further configured to generate a maintenance recommendation based on the estimated amount of wear in the nut.

10. The veneer lathe system of claim 5, wherein each of the electric linear positioners of said pair further includes a temperature sensor operatively coupled with the roller screw assembly and the controller, and wherein the temperature sensor is positioned to detect a temperature of one or both of the nut and the screw shaft.

11. The veneer lathe system of claim 10, wherein the controller is further configured to
    determine that the detected temperature exceeds a predetermined maximum temperature, and
    in response, generate a maintenance recommendation or stop the motors.

12. The veneer lathe system of claim 10, wherein the controller includes a secondary drive controller and a primary controller in electronic communication, the secondary controller operatively coupled with the encoders or resolvers, and the primary controller operatively coupled with the temperature sensor and the linear position sensors.

13. The veneer lathe system of claim 12, wherein the secondary drive controller is configured to detect a position of the knives based at least on data received from the encoders or resolvers, and the primary drive controller is configured to detect the position of the knives based at least on data received from the linear position sensors.

14. The veneer lathe system of claim 13, wherein the primary controller is a programmable logic controller (PLC), and the secondary drive controller is operable to control the electric linear actuators based at least on the data received from the encoders or resolvers and on instructions received from the primary controller.

15. A method of modifying a veneer lathe carriage, the method comprising:
    pivotably coupling a pair of electric linear positioners with respective opposite sides of the veneer lathe carriage, such that the electric linear positioners are selectively actuable to reposition the carriage along a feed path, wherein each of the electric linear positioners includes
    a roller screw assembly, wherein the roller screw assembly includes a nut and a screw shaft disposed through the nut,
    an electric motor coupled to a proximal end of the roller screw assembly and positioned in axial alignment with the roller screw assembly, wherein the electric motor includes a rotary position sensor operable to detect a rotational position of the screw shaft, and
    a linear position sensor coupled to the roller screw assembly, wherein the linear position sensor is configured to detect a position of the nut, and
    operatively coupling the electric linear positioners with a controller configured to
        detect skew of the veneer lathe carriage based on data received from the linear position sensors or the rotary position sensors, and
        operate one or both of the electric motors to correct the detected skew.

16. The method of claim 15, wherein each of the roller screw assemblies includes a corresponding planetary roller screw, and the controller is configured to actuate the electric linear positioners synchronously to thereby reposition the veneer lathe carriage along a feed path.

17. The method of claim 16, wherein each of the electric linear positioners includes a corresponding temperature sensor positioned to detect a temperature of the nut or the screw shaft, the method further including operatively coupling the temperature sensors with the controller.

18. The method of claim 16, wherein each of the electric motors is a servo drive and the rotary position sensors are encoders or resolvers, and wherein operatively coupling the electric motors with the controller includes operatively coupling the encoders or resolvers with the controller.

19. The method of claim 16, wherein the veneer lathe system includes a lathe spindle coupled with a drive shaft and a first sensor operable to detect a rotational speed of the drive shaft or the lathe spindle, the method further including operatively coupling the controller with the first sensor.

20. The method of claim 19, further including operatively coupling the controller with a second sensor positioned to detect a position of the veneer lathe carriage, wherein the second sensor is a vision sensor.

* * * * *